United States Patent [19]

Hujer

[11] 4,239,385

[45] Dec. 16, 1980

[54] PHOTOGRAPHIC COPYING MACHINE WITH MEANS FOR VARYING EXPOSURE ACROSS THE SURFACE OF THE ORIGINAL COPIED

[75] Inventor: Friedrich Hujer, Grunwald, Fed. Rep. of Germany

[73] Assignee: AGFA-Gevaert AG, Leverkusen, Fed. Rep. of Germany

[21] Appl. No.: 37,455

[22] Filed: May 9, 1979

[30] Foreign Application Priority Data

May 12, 1978 [DE] Fed. Rep. of Germany ....... 2820965

[51] Int. Cl.³ .............................................. G03B 27/72
[52] U.S. Cl. .................................................... 355/71
[58] Field of Search ....................... 355/77, 71, 37, 35, 355/38, 46, 54

[56] References Cited

U.S. PATENT DOCUMENTS

| | | | |
|---|---|---|---|
| 3,761,172 | 9/1973 | Letzer | 355/37 X |
| 3,912,391 | 10/1975 | Fleisher et al. | 355/77 X |
| 4,149,799 | 4/1979 | Pone, Jr. et al. | 355/38 |
| 4,152,068 | 5/1979 | Bickl et al. | 355/38 |

Primary Examiner—Richard A. Wintercorn
Attorney, Agent, or Firm—Michael J. Striker

[57] ABSTRACT

A photographic copying machine of the type in which exposure radiation is transmitted through a transparent original onto a photosensitive medium. Arranged in the exposure radiation path is an array of multitudinous controllable-transmissivity elements, the individual transmissivity values of which are individually controllable. A control electronics, preferably incorporating a computer and multiplexer, controls the transmissivity values of the multitude of controllable-transmissivity elements of the array. The transmissivity values to which the multitude of elements are set can be equal, but in accordance with the present invention are not; instead, the array is employed to establish a two-dimensional controllably non-uniform distribution of exposure radiation onto the photosensitive medium. This is done to implement non-uniform density and/or color correction during printing, or to superimpose onto the image projected onto the photosensitive medium images of symbols, text, or the like, which are to be appear on the final copy, or to implement border effects, by way of example.

13 Claims, 3 Drawing Figures

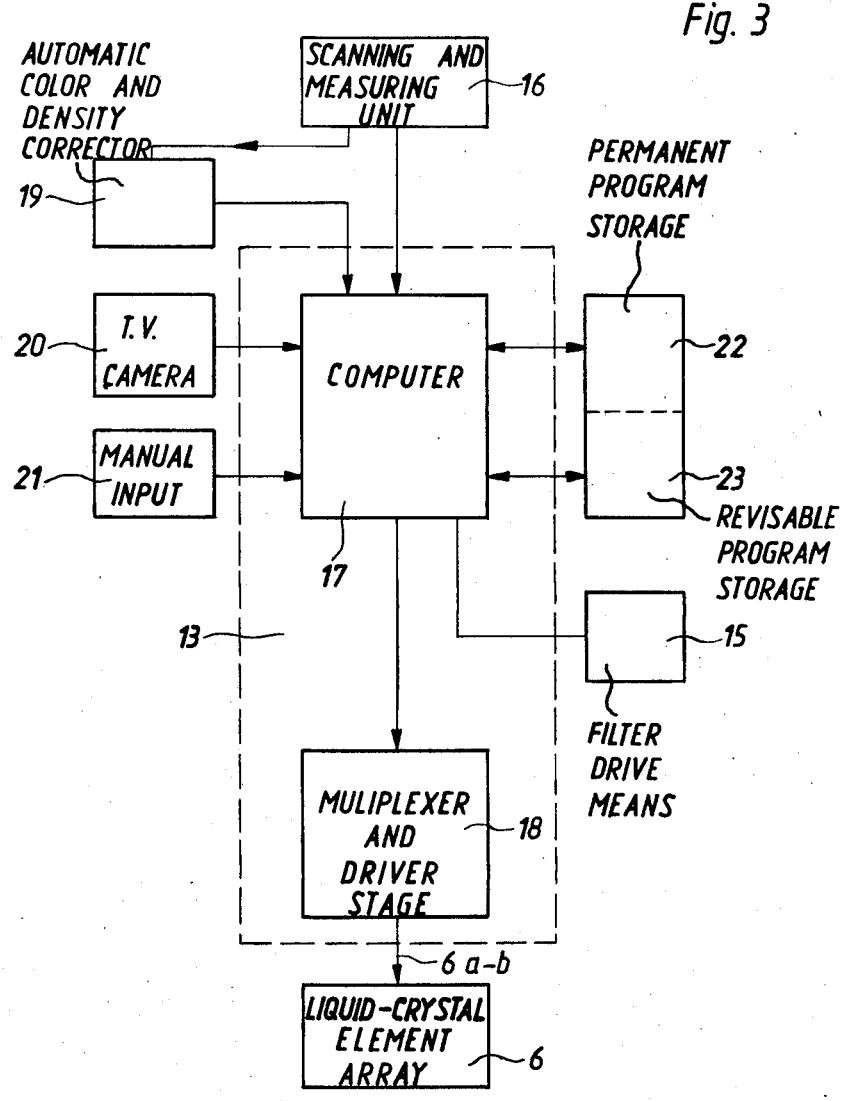

PHOTOGRAPHIC COPYING MACHINE WITH MEANS FOR VARYING EXPOSURE ACROSS THE SURFACE OF THE ORIGINAL COPIED

BACKGROUND OF THE INVENTION

The present invention concerns photographic copying machines, typically including a light source which transmits exposure light through an original, e.g., a positive or negative film transparency, with an optical system being employed to project the light transmitted through the original onto a photosensitive material, such as photographic print paper, or the like.

When making copies or prints in very-high-quality contexts, and likewise when the originals being copied exhibit special or unusual image content, degree of exposure, coloration, or the like, very high demands are placed upon the knowledge, skill and subjective judgement of the technician who performs the copying or adjusts the photographic copying machine which performs the copying. For example, in the case of photographic copying machines, it is known to scan the transparent original being copied on a pointwise, linewise or zonewise basis, and to derive from such scanning operation information concerning density and/or color which is then used to control the operation of the exposure system of the copying machine, either automatically or with the intermediary of operator participation. The corrective expedients then employed include proper selection of the intensity or duration of the exposure radiation, the use of color filters for establishing a proper spectral composition or balance for the exposure radiation in accordance with subtractive or additive copying procedures, and so forth. However, whatever correction or corrections are established for the intensity and/or spectral balance of the exposure radiation employed, the exposure radiation then actually transmitted through the transparent original is, in general, uniform across the entire surface of the transparent original being copied.

This conventional approach to copying places limits upon the degree of correction of exposure radiation which can be realized, relative for example to the amount of imagedependent information which the image scanners so often used would inherently be capable of affording for later use in exposure correction. For example, if the image on the original is, for whatever reason, markedly overexposed in a certain region, e.g., because of intense light reflection from one bright object within the total subject originally photographed, the point-by-point scanner, or the like, which analyzes degree of original exposure preliminary to printing, could very readily provide information indicating that this zone of the image is excessively overexposed, the remainder of the image not excessively overexposed, and also information defining the location of the points of excessive overexposure. In general, however, even if the scanner were made to supply such information in such form, with conventional printers there is no way in which really to make any full use of this information. At most, the printer will be manually or automatically set to an exposure intensity value, applied across the whole surface of the original, which will represent a course compromise between the fact of localized excessive overexposure and, for example, otherwise proper exposure, with the result that the zones of the image not overexposed must either be somewhat underexposed during printing for the sake of the excessively overexposed zones of the original image, or else be properly exposed during printing but with nothing really done with regard to the zone of excessive original exposure. Similar comments apply to localized problems of color balance, where certain objects, shapes or zones of the image on the original, of complex and generally indefinite configuration, exhibit a color character which is undesirable, e.g., because of the colors of certain objects within the total subject photographed, because of intense light reflection from colored bodies located outside the total subject originally photographed, and so forth.

SUMMARY OF THE INVENTION

It is one general object of the invention to provide a photographic copying machine of the type discussed above, but of such a design that the intensity and/or spectral balance of the exposure light which is transmitted through the original onto the photosensitive printing medium can have a controllable and non-uniform two-dimensional spatial distribution.

In accordance with a broad concept of the present invention, this is made possible by utilizing, in the light path which extends from the light source through the transparent original onto the photosensitive printing medium, an intermediate light-transmission control structure comprised of a multitude of tiny zones whose light transmittances can be individually varied.

In the preferred embodiment of the invention, use is made of a sort of optoelectrical mask whose light transmittance can be controlled at individual ones of a multitude of adjoining tiny zones, the zones preferably having diameters as small as 0.1 mm.

The concept of the invention opens the way for many new techniques for both machine-performed and manually performed copying and printing. For example, the border which a final print is to have can be established, and varied, by control of corresponding tiny zones of the electrooptical mask. Likewise, during printing, symbols, identification numbers, whole passages of text, and so forth, can be superimposed onto the image being copied by control of the corresponding zones of the mask.

Of equal interest is the use of such a high-resolution controllable-zone mask for implementing exposure and color corrections during printing. For example, the transmittance of the mask can be increased or lowered, on a wholemask basis, to correct for total under or overexposure of the original being copied. Alternatively, if the image on the original being copied exhibits bright or hot spots or zones, the multitude of zones of the mask can be differently controlled to effect a corrective modification of the intensity (or duration) and/or spectral balance of the exposure light incident upon such spots or zones of the original. For example, with the use of a computer, it becomes a simple matter to instruct the computer to lower the brightness of all image points on the final image which would, in the absence of such countermeasure, exhibit a brightness above a predetermined value, with the predetermined value being selected manually on a trial-and-error basis, or automatically in accordance with a preprogrammed schedule, until a convincing correction of the localized zones of over or underexposure is achieved. Substantially the same thing can be done with regard to localized coloration problems, especially when an additive exposure process is involved. Also, as a further example, a dynamic compression of image range can be achieved by so controlling the multi-zone mask that the printing procedure virtually converts to a half-tone printing technique, with the mask then acting as a gray filter.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 3 is a schematic block circuit diagram of a control system used to control the light transmittance of the individual zones of the multi-zone electrooptical mask used in the present invention.

DESCRIPTION OF PREFERRED EMBODIMENTS

Figure 1:
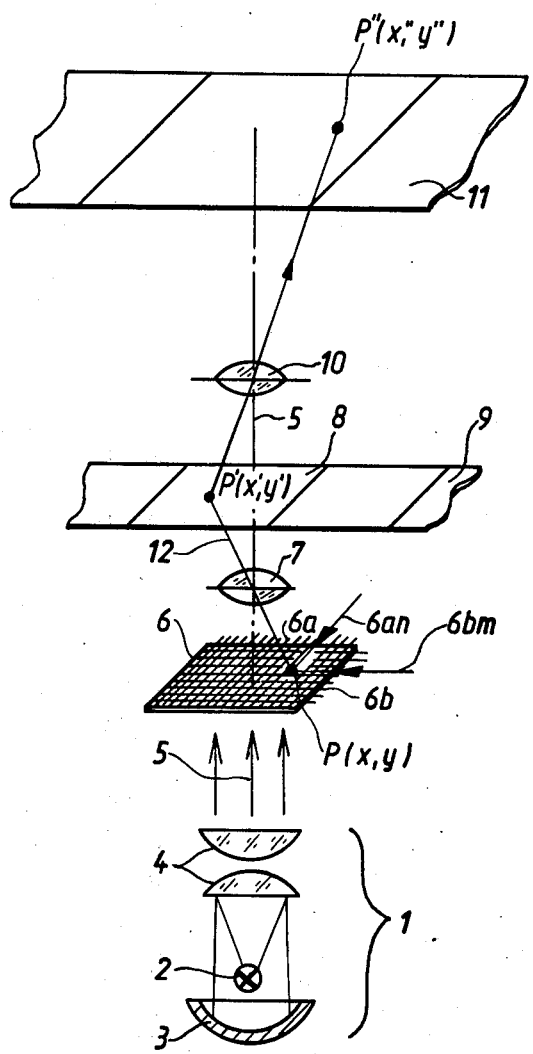
FIG. 1 schematically depicts an inventive exposure system in a photographic copying machine, in perspective view.

In FIG. 1, numeral 1 denotes the exposure system within a photographic copying machine. The exposure system 1 mainly comprises a light source 2, a parabolic reflector 3, and a condensor-lens system 4. Numeral 5 denotes the optical axis of the exposure system. Arranged in the path of light emitted from light source 2 is a liquid-crystal element array 6, the image of which is projected by a first optics 7 onto one negative 8 of a strip of negatives 9. A second optics 10 projects the image of the negative 8 onto a photosensitive medium, in this context photosensitive printing paper 11.

The liquid-crystal element array 6 is a display system of a type more typically intended to find application in, for example, videophones and the like. The liquid-crystal material of the element array 6 is provided on a transparent substrate, and the individual elements of the element array are defined by the points of intersection as between a first set of vertical electrodes 6a provided on one face of the planar structure and a second set of horizontal electrodes 6b provided on the other face of the structure. If the photographic negative 8 involved has dimensions of 24×36 mm and if the liquid-crystal element array 6 is to be of the same size, the array preferably comprises on the order of 480 columns of elements and 720 rows of elements. The diameter of each one of the multitude of individually controllable zones formed would then amount to approximately 0.05 mm.

The transparency of the individual ones of the multitude of individual elements of the element array 6 can be controlled in various ways. For example, one control technique which can be used is to apply to the column electrodes a signal having a voltage value V1, but applying to the row electrodes a signal of higher voltage value V2 and sequentially. To the extent that the current from the lines and columns is in phase, the liquid-crystal material at such locations assumes a non-transparent state; to the extent that the current is out of phase, the liquid-crystal material is at such locations transparent. Phase variations intermediate these extremes result in intermediate values of light transmittance.

Such liquid-crystal element arrays are already known for various purposes, and are discussed, but merely by way of example, in the periodical "Electronics," issue of Dec. 12, 1977, pages 3E and 4E. With such conventional liquid-crystal element arrays, it has been found that the establishment of intermediate transparency or transmittance values can be somewhat problematic, because the liquid-crystal material does not very directly follow changes from one intermediate-range potential-difference value to another, whereas the establishment of transparent (i.e., minimally opaque) and non-transparent (i.e., maximally opaque) states is entirely unproblematic.

For this reason, the invention contemplates, when establishing intermediate transparency values for individual elements of the array, the use of a pulse-duration control technique. Persons skilled in the art will understand that the total exposure of each point of the photosensitive printing paper employing is approximately equal to the intensity of exposure light multiplied by the duration of the exposure interval. Accordingly, if one element of the array is to be set to a transparency value half that of another array element, the first such element can, quite simply, be rendered maximally transparent for a time interval one half as long as that of the other. Alternatively, the first element could be rendered transparent with a transparent/non-transparent duty ratio which is equal to one half that of the other element, and so forth.

The embodiment depicted in FIG. 1 operates as follows:

Parallel light from the exposure system 1 is incident upon the liquid-crystal element array 6 and is projected by the optics 7 onto the negative 8 which is of approximately the same size as array 6. The image of the illuminated negative 8 is in turn projected by the optics 10 onto the photosensitive printing paper 11, but on an enlarged scale.

A point P on the element array 6 having coordinates (x, y) is projected along the light ray 12 onto point P' (x', y') on negative 8, and from there onto point P"(x", y") on printing paper 11. For a first combination of voltages applied to the row and column electrodes 6a, 6b, the liquid-crystal material at point P(x, y) is non-transparent, so that initially the shadow of this point is projected onto the printing paper 11. For a second combination of voltages applied to the row and column electrodes 6a, 6b, the material at point P(x, y) is rendered transparent, for a time interval dependent upon the pulse duration of the applied voltage, so that light is briefly transmitted through point P'(x', y') on negative 8 and is briefly projected onto point P"(x", y") on photosensitive paper 11. It will be understood that the term "point" here employed is not used in the mathematical sense, but refers to the tiny constituent elements of the element array 6.

Figure 2:
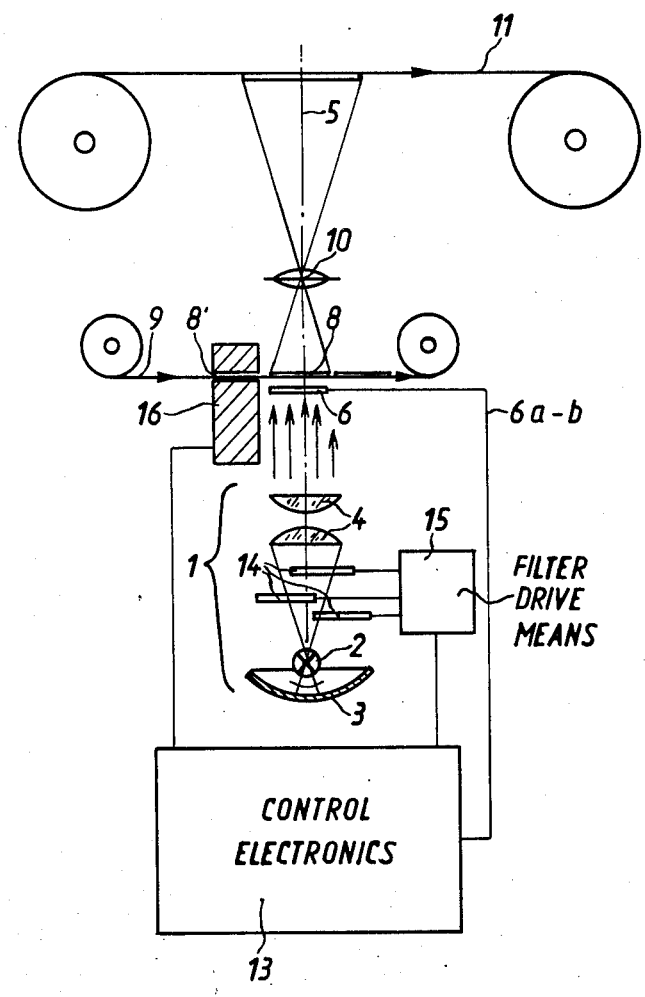
FIG. 2 is a schematic side view of another exemplary embodiment of the invention.

FIG. 2 schematically depicts another exemplary embodiment of the invention, components corresponding to those already described with regard to FIG. 1 being denoted here by the same numerals as there. The liquid-crystal element array 6 is located in the immediate vicinity of the transparent original 9 to be copied, as a result of which the projection optics 7 of FIG. 1 is not needed. In order to avoid the effect of an unsharp mark, the array 6 sould be almost in contact with negative 8. However, if the effect of an unsharp mask is positively desired, the array 6 can be positioned a somewhat greater distance from the original 8. Accordingly, in the embodiment illustrated, it is intended that the array 6 be mounted shiftable in the direction parallel to the optical axis of the system, although to avoid crowding of the drawing such shiftable mounting means for array 6 is not shown. The row and column electrodes 6a, 6b of the element array 6 are connected via (schematically indicated) conductors to the output of a control electronics 13, referred to further below.

Within the exposure system 1, there is arranged between the light source 2 and the condensor-lens system 4 a set of color filters 14, the individual ones of which can be moved into and out of the exposure-light path by means of a drive unit 15, drive unit 15 likewise receiving control signals from an output of control electronics 13.

Arranged along the transport path of the strip of originals 9, upstreams of the actual copying station of the machine, is a scanning and measuring unit 16, which supplies data to the control electronics 13. The scanning means within the scanning and measuring unit 16 is preferably of the type which scans the original on a point-by-point basis, and the information it generates concerning density and/or color is transmitted to the control electronics 13 for performance of an automatic density and/or color correction during printing. An automatic density and/or color correction can then be performed, in accordance with conventional density and color-correction criteria, but in a manner spatially differentiated across the surface of the original and the printing paper. For example, if the system is set up to counteract localized zones of excessive overexposure, limits can be placed upon the intensity or duration of the illumination of the part of image exhibiting excessive degrss of overexposure above a predetermined value, with no such limitation upon the illumination of the remaining portions of the image on the original but instead, for such not excessively overexposed zones of the original resort being had to conventional overexposure and/or underexposure correction. This is said merely by way of example. Similar comments apply with regard to automatic color correction especially when the printing process involved is additive, and resort can be had to a spatially differentiated exposure procedure for each constituent color.

Alternatively, the point-by-point image information derived from the negative 8' by the scanning and measuring unit 16 can be stored within the control electronics 13, so that, when the negative 8' is later located at the copying station, the image content of the negative itself can be used to modulate the transparencies of the individual zones of the element array 6, in which event the element array 6 can be used as a gray filter for compression of the dynamic range of the exposure.

Others of the many possible applications of the inventive concept will be referred to in connection with the schematic block circuit diagram depicted in FIG. 3. In FIG. 3, the scanning and measuring unit 16, the control electronics 13, the liquid-crystal element array 6 and the drive means 15 for the filters 14 are shown again. The control electronics 13 here is mainly comprised of a computer 17 and a multiplexer and driver stage 18 for the liquid-crystal element array 6. The sequential signal generated by the scanning and measuring unit 16 is fed through an automatic density and color correction stage 19 into a computer 17, or the computer can be programmed to perform such functions itself. The computer 17 controls the drive means 15 for the set of color filters 14, and additionally controls the multiplexer and driver stage 18 for the liquid-crystal element array 6.

In the illustrative system of FIG. 3, there is included a television camera, vidicon tube, or the like, 20 and can be used to pick-up the image of, for example, markings, symbols, words, graphs, or the like, which are to appear in the final print superimposed upon the image from the negative being copied. In view of the considerable number of elements involved in the element array 6, this represents a particularly simple way of converting such graphical information into signals which the computer 17 can use for control of individual elements of the array. For example, those array elements located within the letters or other shapes to appear on the final print can simply be rendered fully transparent or fully non-transparent by the computer, i.e., in accordance with the pulse-duration modulation technique referred to above, by keeping the array elements involved non-transparent or by rendering them transparent for a maximum time interval.

In the illustrated system, there is additionally provided a manual input stage 21 which can be used by the operator of the automatic printer, for example when the results of automatically performed density and/or color corrections are, for any reason, not producing a convincing print. Thus, as already explained by way of example, the computer 17 can be programmed to limit the degree of illumination of those overexposed zones of the negative which are so clearly overexposed, e.g. hot spots, that their degree of exposure exceeds a predetermined value. If, when the illumination is automatically corrected in this way the resulting print does not convey a convincing effect, e.g., because of the particular image content involved, the operator of the machine may intervene, using manual input stage 21, and command the computer to increase or lower the predetermined value at which the automatic limiting of illumination is to occur, until a more convincing effect is achieved. However, this is stated merely by way of example.

In addition, the computer can be programmed to implement a border effect on the print paper itself, by controlling those elements of the element array 6 located in correspondence to the border to be established. The dimensions of the border can, for example, be fed into the computer through the intermediary of the television scanning tube 20 or by setting manual selector switches of the manual input stage 21.

The program for the computer 17, which depends upon what printing effects the computer 17 is intended to implement, is stored in a program storage unit 22 (ROM), and contains the requisite control information for the computer to process usually sequential input signals and issue usually sequential control signals. Additionally, the computer is provided with a storage 23 (PROM) for a revisable program, which is updated to take into account the exposure-control criteria which become appropriate for particular customer orders and those program modifications which are needed if more sophisticated exposure-illumination control effects are to be implemented.

The principles of the invention have been elucidated above with regard to automatic density and color correction, and with regard to such special effects as picture masking, image superposition, the provision of superimposed symbols and the like, and the optoelectrical production of border effects. However, it will be understood that these operations are merely representative of a multitude of special-purpose effects which become possible with the present invention, including for example density and color modification spatial distributions of greater complexity.

It will be understood that each of the elements described above, or two or more together, may also find a useful application in other types of circuits and constructions differing from the types described above.

While the invention has been illustrated and described as embodied in a photographic copying machine provided with a system capable of certain specified exemplary modes of operation, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. In a photographic copying machine which utilizes light from a projector to print an image of a transparent original upon a photosensitive medium by projecting the light through the original to impinge upon the medium after passing through the original, an improvement designed to individually vary image intensity of extremely small subregions of the image printed on the medium when the subregions in aggregate form the image in its entirety, comprising:

an extremely large number of extremely small variable-density grey filters arranged in an array, each such grey filter being individually variable and corresponding to one of the subregions of the image, the array being located intermediate the projector and the original to individually vary intensity of light projected through corresponding subregions of the original; and a control connected to each of the grey filters and varying the densities thereof to individually vary intensity of each subregion of the image and thereby, in the aggregate, vary the intensity of the image in its entirety.

2. The improvement defined by claim 1, further including at least one color-correction filter optically interposable between the projector and the array, and still further including means connected to the control and all such color-correction filters for optically interposing all such color-correction filters between the projector and the array and optically withdrawing all such color-correction filters from between the projector and the array, whereby the image printed on the medium can be appropriately color-corrected.

3. The improvement defined by claim 1, further including a scanner connected to the control, the scanner monitoring image density of the original and appropriately adjusting the control so as to properly print an image on the medium.

4. The improvement defined by claim 2, further including a scanner connected to the control, the scanner monitoring image density and color composition of the original and appropriately adjusting the control so as to properly print a color-corrected image on the medium.

5. The improvement defined by claims 1, 2, 3 or 4, wherein the array is located immediately adjacent the original and has dimensions equal thereto.

6. The improvement defined by claims 1, 2, 3 or 4, wherein each variable-density grey filter is a liquid-crystal element.

7. The improvement defined by claim 6, wherein each liquid-crystal element has a maximally transparent state and a maximally opaque state, and wherein the control varies the density of each element by establishing a duty cycle within which the liquid-crystal element alternates between said states.

8. The improvement defined by claim 7, wherein the array is ordered into rows and columns and wherein the control varies the density of each individual element by applying a first control voltage to individual columns and a second control voltage to individual rows sequentially, the control voltages being out of phase with respect to each other.

9. The improvement defined by claim 5, further including a shifter connected to the array and shifting the array towards and away from the original, whereby sharpness of the image can be adjusted.

10. The improvement defined by claims 1, 2, 3 or 4, further including a user-operable control input connected to the control, the control input adjusting the control.

11. The improvement defined by claims 1, 2, 3 or 4, wherein the control includes a computer.

12. The improvement defined by claim 11, further including a user-operable control input connected to the computer and varying operation thereof.

13. The improvement defined by claim 11, further including an electronic image pickup means connected to the computer and operative for converting a picked-up image into information which can be processed therein, whereby said picked-up image can be superposed upon the medium.

* * * * *